United States Patent [19]
Braukmann

[11] 3,730,426
[45] May 1, 1973

[54] THERMOSTATIC VALVE

[75] Inventor: Heinz-Werner Braukmann, Mosbach/Baden, Germany

[73] Assignee: Brankmann Armatures AG, Rothrist, Switzerland

[22] Filed: Nov. 5, 1970

[21] Appl. No.: 87,242

[30] Foreign Application Priority Data

Nov. 13, 1969 Germany..................P 19 56 991.6

[52] U.S. Cl......................236/44 C, 73/336, 337/300
[51] Int. Cl...........................................G05d 22/00
[58] Field of Search......................236/44 C, 44, 61, 236/64, 92; 73/344, 336; 337/300

[56] References Cited

UNITED STATES PATENTS

| 1,995,826 | 3/1935 | Soderberg | 236/92 R |
| 2,419,630 | 4/1947 | Cruzan et al | 236/92 R |
| 1,953,923 | 4/1934 | Bulley | 236/44 C |
| 1,504,080 | 8/1924 | Roesch | 236/44 C |
| 2,010,040 | 8/1935 | Shurtleff | 73/336 X |

Primary Examiner—William E. Wayner
Attorney—McGlew and Toren

[57] ABSTRACT

A thermostatic valve includes a temperature responsive movable member and a humidity responsive movable member connected to a movable valve.

1 Claim, 2 Drawing Figures

INVENTOR.
HEINZ-WERNER BRAUKMANN

THERMOSTATIC VALVE

SUMMARY OF THE INVENTION

This invention relates in general to the construction of valves and in particular to a new and useful thermostat valve having both a temperature and humidity control for regulating the movement of a valve member. Thermostatic valves are known for controlling the heating of rooms where the temperature is to be kept constant and the valves are opened and closed depending on whether the desired temperature exceeds or drops below a predetermined value. Comfort in a room is determined not only by temperature, but also by the force of the air movement, the surface temperature of the surrounding walls and to a considerable extent, also by humidity. Air conditioners therefore control, not only the room temperature, but particularly the humidity. Because humidity does materially influence comfort in the United States, for example, the term "effective temperature" has been coined. By this term is meant the temperature of the air saturated with vapor which produces the same feeling of comfort to the majority of people in a certain room air whose effect is to be evaluated. In this way, a general yard stick is provided. A comfort range is known in air conditioning within which a drop of the temperature is recommended with rising humidity.

Apart from the above-mentioned solution for controlling the temperature and the humidity, there is also the possibility of leaving the humidity unchanged but controlling the temperature to achieve a feeling of comfort. When using a thermostat radiator valve of known design, this can be achieved by measuring the humidity at intervals and setting the thermostat of the valve after each measurement with the setting being in accordance with the temperature which is known to ensure a maximum of comfort at the determined humidity.

In accordance with the present invention, there is provided a thermostatic valve wherein a preselected basic temperature is corrected automatically and continuously to an accepted temperature value which is adapted to the respective humidity to achieve maximum comfort. This problem is solved, in accordance with the invention, by providing a valve member which is movable under the control of both an expandable and contractable temperature sensitive element and an expandable and contractable humidity sensitive element. The construction includes a mechanical interconnection of the valve member with both a movable element of a temperature thermostat and a member having a humidity dependent coefficient of expansion. The member and the thermostat are mechanically interconnected in series. When the humidity dependent expansion coefficient member contracts at a constant temperature but varying humidity, the valve member is moved in one direction and when it expands, the valve member is moved in an opposite direction. On this opening and closing operation of the valve member is superimposed the opening and closing movement caused by the thermostat provided the temperature of the medium to be regulated for example, room air, varies together with the humidity.

When the valve disc is connected directly with the humidity sensitive member, care must be taken that there is no contact with the medium flowing through the valve or that it cannot be influenced by it. In the preferred embodiment of the invention, the humidity dependent member is advantageously located between the valve member or valve disc and the temperature responsive thermostat. The valve disc is advantageously carried on a spindle which is connected to the humidity dependent member and this member is in turn connected to a movable piston of a thermostat. The member with the humidity dependent coefficient of expansion may also be located between the thermostat adjoining the valve spindle and a supporting surface within the housing of the valve. This supporting surface is arranged in conventional valves in the proximity of a hand wheel or control knob. It can be formed, for example, by the inner cover surface of a control knob. A compression spring may be arranged between the member with the humidity dependent coefficient of expansion and the thermostat. In such a case, the thermostat which is located exteriorly of the valve, is not supported directly on the member with the humidity dependent coefficient of expansion but indirectly over the spring. With the inventive arrangement, the spindle of the valve member may advantageously be connected in series, first with the thermostatic member and then the member which is expandable in dependence on humidity, or the other way around.

Accordingly, it is an object of the invention to provide an improved thermostatic valve which includes a valve member which is movable under the control of both temperature expandable and contractable and humidity expandable and contractable members.

A further object of the invention is to provide a thermostatic valve which includes a housing defining a flow passage with a valve seat in the passage which may be closed by a valve member and wherein the valve member includes a spindle which is connected to a first member which is expandable and contractable in accordance with changes in the humidity and a second member which is expandable and contractable in accordance with the changes in temperature, the housing including a chamber for accommodating the first and second members out of the flow path of the medium which is to be passed through the housing and which includes openings for communicating the first and second members to the ambient air.

A further object of the invention is to provide a valve which is simple in design, rugged in construction, and economical to manufacture.

The various features of novelty which characterize the invention are pointed out with particularity in the claims annexed to and forming a part of this disclosure. For a better understanding of the invention, its operating advantages and specific objects attained by its uses, reference should be had to the accompanying drawings and descriptive matter in which there are illustrated preferred embodiments of the invention.

GENERAL DESCRIPTION OF THE PREFERRED EMBODIMENTS

Figure 1:
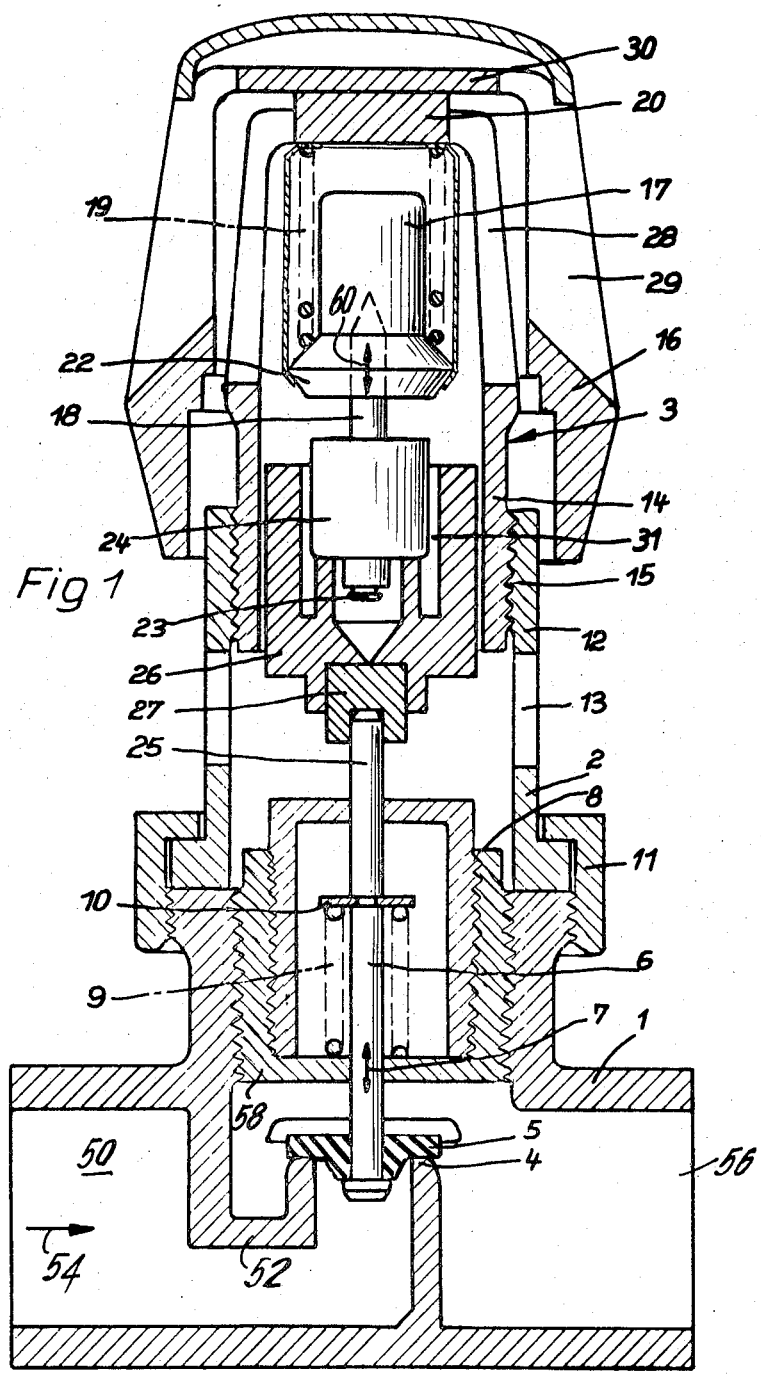
FIG. 1 is a longitudinal sectional view through a thermostat constructed in accordance with the invention.

Referring to the drawings in particular the invention embodied therein in FIG. 1, comprises a thermostatic valve having a valve body or bottom housing part 1 which defines an interior flow passage 50 with a separating wall 52 defining a valve seat 4 which may be opened or closed to permit flow of fluid in the direction of an arrow 54 and out through a discharge 56. The housing bottom part also provides a base upon which is mounted an intermediate piece 2. A control attachment, generally designated 3, includes a screw attachment part 14 which is threaded to interior threads 15 of the top part 12 of the intermediate piece 2. The valve disc 5 is carried on an axially movable spindle 6 movable in the direction of the double arrow 7 in dependence on changes in both temperature and humidity.

The valve spindle 6 is guided in an insert member 8 which closes the flow passage of the bottom part 1 of the housing and which provides a support for the spindle at two axially spaced points. A compression spring 9 abuts against a spring retainer washer 10 affixed to the spindle 6 and an interior end wall 58 which closes the bottom of the valve spring chamber. The spring 9 biases the valve toward an opened position.

The intermediate piece 2 is connected with the bottom part 1 by means of a check-nut 11 and it comprises a material of very low thermal conductivity. The part of the housing defined by the intermediate piece 2 and the control attachment 3 is vented to the atmosphere by openings or slots 13 and 28 in order that the elements in this part of the housing be influenced by the surrounding air.

The control attachment 3 provides the upper portion of the valve housing and a knob or outer cover part 16 is rigidly interconnected with the control attachment 3 and rotation of the knob causes the threading of the control attachment into the upper portion 12 of the intermediate piece 2. A thermostat 17 is arranged within the upper housing part formed by the control attachment 3 and the knob 16 and it includes a movable piston 18 which moves in the directions of the double arrow 60, in accordance with changes of temperature. The thermostat 17 includes a compression spring 19 which biases a reinforcement 22 which carries the working piston 18 in a closing direction of valve movement. The opposite end of the spring 19 rests on a supporting member 20 which is formed integral with the wall of the knob 16.

The free end of the working piston 18 is rigidly connected by means of a screw 23 with an enlargement piece 24. A member 26, which is expandable and contractable in accordance with changes in the humidity, is disposed between the enlargement piece 24 and the inner end 25 of the valve spindle 6. A reinforcement piece 27 of a distinct material from that of the member 26 is arranged between the end of the spindle 6 and the member 26.

The arrangement is such that the member 26 with the humidity dependent coefficient of expansion material and the thermostat 17 which is temperature responsive is mechanically connected in series with the spindle 6. The pushout movement of the working piston 18 from the thermostat 17 which usually occurs during the heating of the thermostat, and the expansion movement of the member 26, which results from a variation, for example, an increase of humidity, thus add up and produce a cumulative effect on the movement of the valve member 5. Thus, the member 26 provides a nominal value adjustment for the thermostat and the size of this adjustment is dependent on the variation and hence increase or decrease of the humidity of the medium to be regulated, for example, the humidity of the room air. The venting of the interior of the upper chamber portion by the slots 28 and 29 and the slots 13 provide a good connection of the member 26 with the room air to be regulated. The upper slots 28 and 29 provide a means for establishing a good wetting of the thermostat 17.

In some instances, the supporting member 20, which bears on the wall 30 of the knob 16, is made of a material with a humidity dependent coefficient of expansion either in place of the member 26, or in addition to this member. When both members 26 and 20 are made of such material the action is enhanced. The member 26 is provided with a groove 31 which extends deeply in an axial direction and increases the effective outer surface of the member.

Figure 2:
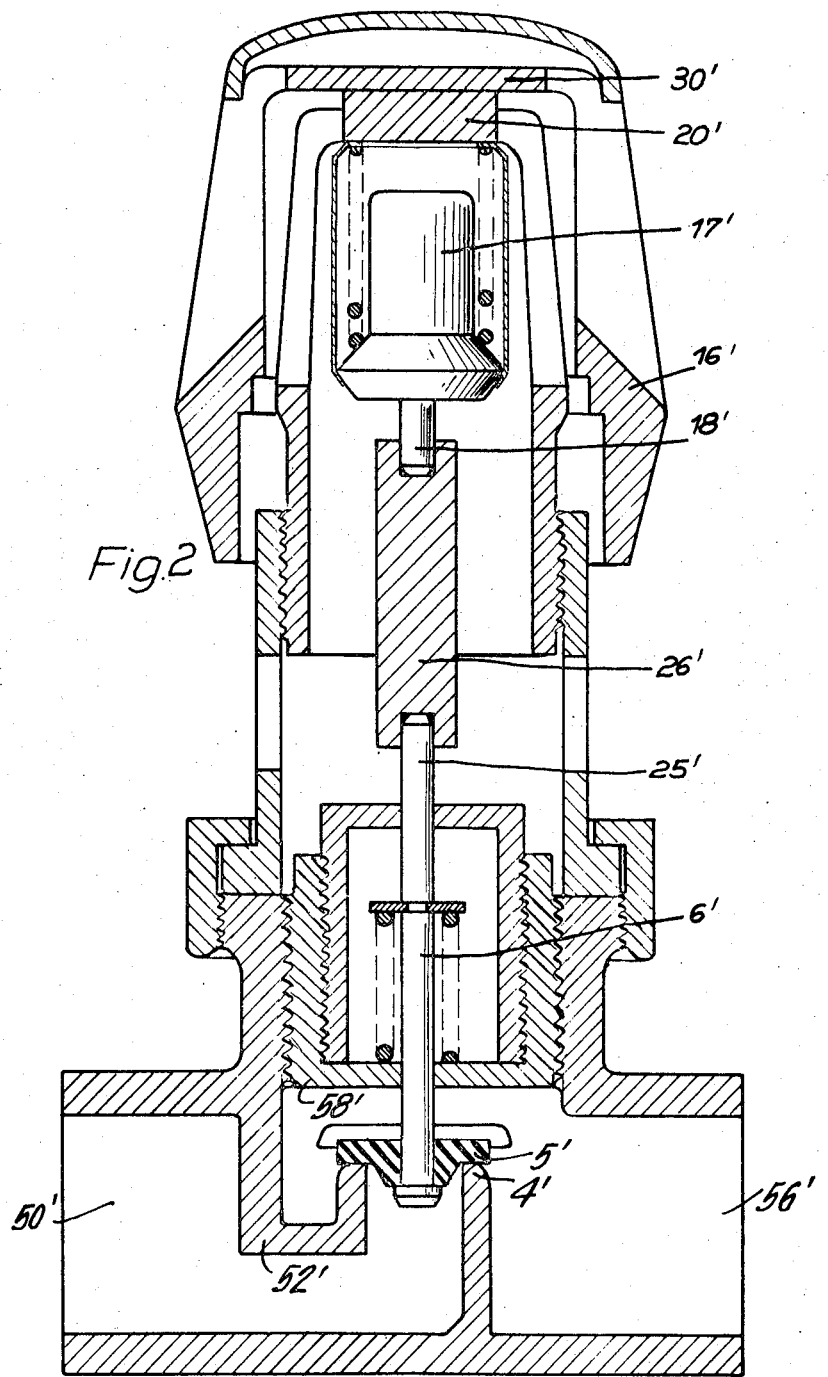
FIG. 2 is a view similar to FIG. 1 of another embodiment of the invention.

In the embodiment of FIG. 2, similar parts are similarly designated but with primes. In this embodiment, a member 26, with a humidity dependent coefficient of expansion is arranged between the free end of the working piston 18' of the thermostat 17' and the inner end 25, of the valve spindle 6'.

The enlargement piece 24 of the arrangement of FIG. 1 has been omitted and in addition, the member 26' is substantially smaller in exterior diameter than the comparable member 26 of FIG. 1. In addition, the reinforcement piece 27 which is employed in FIG. 1 is not provided in the embodiment of FIG. 2. In other respects the operation and parts are similar.

The device of FIG. 2 includes a supporting member 20, which advantageously comprises a material having a humidity dependent coefficient of expansion. The supporting member 20' may advantageously be incorporated in the wall 30'. In some instances the humidity dependent coefficient of expansion material of either the member 26' or the member 20' is provided with slots, grooves or projections in order to increase its effective area.

In a construction in which only the member 20' is made of a material which expands and contracts in accordance with changes in the humidity, the piston 18' may be directly connected to the spindle 6'.

What is claimed is:

1. A thermostatic valve including a temperature and a humidity control for a heating plant and the like, comprising a valve housing forming a flow passageway through one part thereof, said valve housing including wall means in said flow passageway forming a partition extending across the flow passageway and providing an opening for admitting flow through said passageway, the periphery of the opening in said wall means defining a valve seat, a valve disc movably positionable between a first position on said valve seat for blocking flow through the opening and at least a second position spaced from said valve seat for admitting flow through the opening, an axially extending spindle assembly secured to said valve disc and extending through said housing in another part thereof extending outwardly from said flow passageway, said valve spindle assembly including a spindle part secured at one end to said disc valve, and a humidity sensing member and a temperature sensing member arranged in series along the axis of said spindle assembly and extending from the end of said spindle part opposite from the end attached to said valve disc, said temperature sensing member including a thermostat having a working piston positioned on the axis of said spindle assembly, said another part of said housing extends transversely outwardly from said one part forming said flow passageway, said another part of said housing having an end wall closing its end adjacent said one part and blocking flow between said another part and said flow passageway, said spindle part extending from said valve disc through said end wall into said another part of said housing, a reinforcement piece secured to the end of said spindle part within said another housing, said humidity sensing member comprises a first member expandable and contractible in accordance with changes in humidity and being fitted to said reinforcement piece and being formed of a material distinct from the material of said reinforcement piece, said thermostat positioned axially outwardly from said first member, said working piston of said thermostat extending from said thermostat toward said first member, an enlargement member secured to the end of said working piston spaced from said thermostat and located within and in contact with said first member, said thermostat having a reinforcement section extending radially outwardly from the remainder of said thermostat at its end closer to said valve disc, an axially extending compression spring bearing against said reinforcement section of said thermostat at one end and against said housing at its other end spaced axially outwardly from said thermostat for biasing said working piston of said thermostat in the closing direction of said valve disc, said another part of said housing having slots therethrough for admitting the ambient atmosphere into the interior thereof for contact with said humidity sensing member and said temperature sensing member, spring means associated with said spindle part for biasing said spindle part and said valve disc into the second position, and said another part of said housing including a rotatable knob member for varying the control of said valve.

* * * * *